3,395,148
α-L-(9-ADENINYL)-α'-D-(HYDROXYMETHYL)-DI-
  GLYCOLIC ALDEHYDE, PHOSPHATE ESTERS
Harvey E. Alburn, West Chester, and William Dvonch,
  Radnor, Pa., assignors to American Home Products
  Corporation, New York, N.Y., a corporation of
  Delaware
No Drawing. Continuation-in-part of application Ser. No.
  434,091, Feb. 19, 1965. This application Mar. 6, 1967,
  Ser. No. 620,592
            5 Claims. (Cl. 260—252)

ABSTRACT OF THE DISCLOSURE

Diglycolic aldehyde phosphates (IV) are prepared by periodic acid oxidation of adenosine mono-, di- and triphosphates and diphosphopyridine nucleotide. Compounds (IV) have anti-inflammatory activity.

Reference to earlier applications.—This application is a continuation-in-part of copending application Ser. No. 434,091, filed Feb. 19, 1965, now Patent No. 3,317,535.

This invention is directed to compounds having anti-inflammatory activity, as determined by standard experimental procedures with warm blooded animals, and to therapeutic compositions containing such compounds.

The compounds found to exhibit the above indicated activity are the following:

α - L - (9 - adeninyl)-α'-D-(hydroxymethyl)diglycolic aldehyde (I); monopotassium bisulfite addition compound of the periodate-oxidation product of cytidine, also called: 6-L-(1-cytosinyl)-5-hydroxy - p - dioxane - 2 - D-carboxaldehyde, potassium hydrogen sulfite addition product (II); monopotassium bisulfite addition compound of the periodate-oxidation product of uridine, also called: 6-L-(1-uracilyl)-5-hydroxy-p-dioxane-2-D-carboxaldehyde, potassium hydrogen sulfite addition product (III); α - D - methoxy-α'-D-(hydroxymethyl)diglycolic aldehyde; α-D-methoxy-α'-D-(hydroxymethyl)diglycolic aldehyde, bis sodium bisulfite addition compound; α-L-(1 - uracilyl)-α'-D-(hydroxymethyl)diglycolic aldehyde; α-L-(9-xanthinyl)-α'-D-(hydroxymethyl)diglycolic aldehyde; α - L - (9-hypoxanthinyl)-α'-D-(hydroxymethyl)diglycolic aldehyde; and α-L-(9-adeninyl)-α'-D-(hydroxymethyl)diglycolic aldehyde, phosphate esters (mono-, di- and tri-) and the periodate-oxidation product of diphosphopyridine nucleotide (DPN), which is called α-L-(9-adeninyl)-α'-D-(hydroxymethyl)diglycolic aldehyde α-L-(3 - carbamyl-1-pyridyl)-α'-D-(hydroxymethyl)diglycolic aldehyde diphosphate.

Description of the invention.—The compounds with which this application is particularly concerned are those of Formula IV:

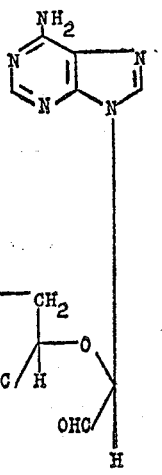

wherein:
  n is a whole number of 1 to 3; and
  R is hydrogen or, when n is 2

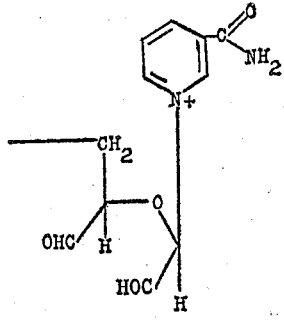

Special mention is made of the valuable embodiments which are α-L-(9-adeninyl)-α'-D-(hydroxymethyl)diglycolic aldehyde monophosphate (a compound of Formula IV wherein n is 1 and R is hydrogen); α-L-(9-adeninyl)-α'-D-(hydroxymethyl)-diglycolic aldehyde diphosphate (a compound of Formula IV wherein n is 2 and R is hydrogen); α-L-(9-adeninyl)-α'-D-(hydroxymethyl)diglycolic aldehyde triphosphate (a compound of Formula I wherein n is 3 and R is hydrogen); and α-L-(9-adeninyl)-α'-D-(hydroxymethyl)diglycolic aldehyde α-L-(3-carbamyl-1-pyridyl)-α'-D-(hydroxymethyl)diglycolic aldehyde diphosphate (a compound of Formula IV wherein n is 2 and R is

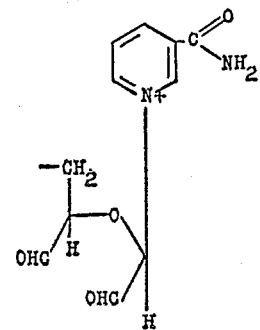

To prepare compound (I), adenosine (5.00 g.; 18.7 mmole) is oxidized with 0.1 M periodic acid solution (206 ml.; 20.6 mmole) for half an hour at 25° C. in the dark. The solution is passed over a Dowex-1-acetate column (32 ml. volume), and the column is washed with one liter of water. The iodate-periodate-free solution and wash are freeze-dried to yield the periodate-oxidation product. The diglycolic aldehydes in the above list and particularly those of Formula IV are prepared in the same manner.

Compounds (II) and (III) are prepared first by reacting cytidine and uridine, respectively, with periodic acid, as above described for compound (I) and then dissolving about 0.01 mole of the periodate oxidation products thus produced in 100 ml. of water with about 0.005 mole of potassium metabisulfite. The resulting solution is then freeze-dried and the compounds are obtained in substantially quantitative yields. The bis sodium bisulfite compound in the above list is prepared as indicated in the foregoing but using 0.02 mole of sodium bisulfite.

Description of the preferred embodiments.—The following examples show the preparation of the compound of this invention. They are simply illustrative and are not to be construed to limit its scope in any manner whatsoever.

Example 1.—α-L-(9-adeninyl)-α'-D-(hydroxymethyl)-diglycolic aldehyde monophosphate 5'-adenylic acid (14.2 g.; 40.9 mmoles) is oxidized with 0.1 M periodic acid (450 ml.; 45.0 mmoles) for 1 hr. at 25° in the dark. Oxidation is complete at a 94–95% level at this time. The solution is passed over a column of Dowex-1-acetate (69 ml.; 90 meq.), and the column is washed with three column volumes of water. The self-eluate and wash are freeze-dried to give 8.5 g. product. Analysis of the product confirms the empirical formula as being $C_{10}H_{12}N_5O_7P$.

Example 2.—α-L-(9-adeninyl)-α'-D-(hydroxymethyl)-diglycolic aldehyde diphosphate Adenosine diphosphate, 0.854 g., 2.0 mmoles, is oxidized with 0.1 M periodic acid, 22.0 ml., 2.20 mmoles, for 1 hr. at 25° C. in the dark. The solution is passed over a column of Dowex-1-acetate, 4.0 ml., 5.2 meq., and the column is washed with 25 ml. of water. The self-eluate and wash are freeze-dried to yield 37% of the theoretical amount of the desired product.

Example 3.—α-L-(9-adeninyl)-α'-D-(hydroxymethyl)-diglycolic aldehyde triphosphate Adenosine triphosphate, 1.0 g., 2.0 mmoles, is oxidized with 0.1 M periodic acid, 22 ml., 2.2 mmoles, for 2 hours at 25° C., in the dark. The solution is passed over a column of Dowex-1-acetate, 3.4 ml., 4.4 meq., and the column is washed with 20 ml. of water. The combined eluates are freeze-dried to yield 44% of the theoretical amount of the desired product.

Example 4.—α-L-(9-adeninyl)-α'-D-(hydroxymethyl)-diglycolic aldehyde α-L-(3-carbamyl-1-pyridyl)-α'-D-(hydroxymethyl)diglycolic aldehyde diphosphate Diphosphopyridine nucleotide, 1.0 g., 1.5 mmoles, is oxidized with 0.1 M periodic acid, 36 ml., 3.6 mmoles, for 3 hours at 25° C. in the dark. The solution is passed over a column of Dowex-1-acetate, 10 ml., 13.0 meq., and the column is washed with 30 ml. of water, with 30 ml. of 0.1 M acetic acid, then with 30 ml. of 1 M acetic acid. The combined eluates are freeze-dried to yield 63% of the theoretical amount of the desired product.

The compounds of the invention are administered to an organism having an inflammatory condition such as chronic arthritis, chronic or acute gout, scleroderma, etc. at a daily dosage range ranging from 5 to 120 mg./kg. of body weight, depending upon the precise inflammatory condition to be treated and its severity. A therapeutically administrable composition in accordance with this invention contains from 1.5 to 80 mg. of these compounds dissolved in 1 cc. of water, 0.5% carboxymethyl cellulose solution or corn oil. The compounds of the invention may be administered by intravenous, intramuscular, intraperitoneal or subcutaneous methods as desired depending on the particular species being treated and the adaptability of the species to the mode selected.

The present compounds are evaluated for their anti-inflammatory activity by the following tests. In one of these tests, male Charles River rats weighing approximately 200 g. are used. Arthritis is induced by an intradermal injection of 0.05 ml. of a suspension of heat killed tubercle bacilli in mineral oil (concentration 5 mg. per ml.) into the plantar surface of the left hind paw. The compounds are administered on the day that the tubercle bacilli are injected and daily thereafter for 14 days. Change in body weight, severity of lesions of the ears and tail, and percentage prohibition of increase in thickness of the injected foot are used to evaluate the activity of compounds. Comparison is made with hydrocortisone as the standard [Newbould, B. B., Brit. Jour. Pharm. Chemoth., 21: 127–136 (1963)]. When evaluated by the above-outlined procedure, compound (I) exhibits three times the activity of hydrocortisone.

The present compounds also are tested for anti-inflammatory activity by the method of C.A. Winter, et al., Federation Proceedings, March-April 1963, 22, No. 2, Part I. In this test, bilaterally adrenalectomized Wistar male rats, weighing 150±30 grams each, are anesthetized and 2 cotton pellets are inserted subcutaneously. Room temperature is maintained at 78–80° F. and animals are provided with 1% saline containing 0.01% glucose, and a standard stock diet. Beginning on the same day the compound being tested is administered twice intramuscularly, orally or subcutaneously daily for 5 consecutive days (10 doses) and the autopsies are performed on the 7th day. The granulomas (cotton pellets) are dried for 72 hours at 80° C. and then maintained for 24 hours at room temperature. The pellets are weighed individually.

(1) Initial and (2) final body weights are determined to the nearest gram; as are (3) weights of pooled thymus (wet); (4) net weight dry granulomas to nearest 0.1 mg.

(A) percent inhibition=100%—

$$\left[\frac{\text{Average increase (mean) in pellet weights of treated group}}{\text{Average increase (mean) in pellet weights of control group}} \times 100\%\right]$$

(B) Statistical significance and percent relative potency of test compound are compared with phenylbutazone. When evaluated by the above procedure, α-L-(9-adeninyl)-α'-D-(hydroxymethyl)-diglycolic aldehyde monophosphate caused a 13% inhibition at 7.5 mg./animal and a 39% inhibition at 15.0 mg./animal, both dosages subcutaneously.

The compounds of this invention can be made available in administrable unit dosage forms by associating them with well known inert carriers.

Having fully disclosed their invention in the foregoing paragraphs, the subject matter which the applicants regard as novel is specifically pointed out and particularly claimed as follows:

1. A compound of the formula

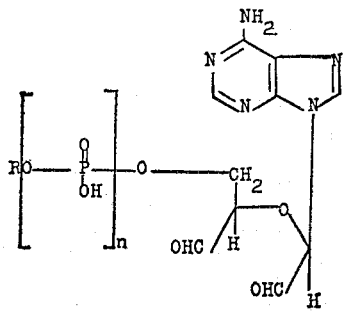

wherein:
 $n$ is a whole number of 1 to 3; and
 R is hydrogen or, when $n$ is 2

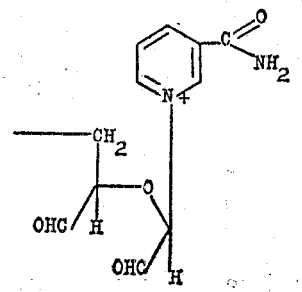

2. A compound as defined in claim 1 which is α-L-(9-adeninyl)-α'-D-hydroxymethyl)diglycolic aldehyde monophosphate.

3. A compound as defined in claim 1 which is α-L-(9-adeninyl)-α'-D-(hydroxymethyl)diglycolic aldehyde diphosphate.

4. A compound as defined in claim 1 which is α-L-(9-adeninyl)-α'-D-(hydroxymethyl)diglycolic aldehyde triphosphate.

5. A compound as defined in claim 1 which is α-L-(9-adeninyl)-α'-D-(hydroxymethyl)diglycolic aldehyde α-L-(3 - carbamyl-1-pyridyl)-α'-D-(hydroxymethyl)diglycolic aldehyde diphosphate.

References Cited

UNITED STATES PATENTS 3,170,917  2/1965  Laufer et al. _____ 260—252

NICHOLAS S. RIZZO, *Primary Examiner.*

A. M. TIGHE, *Assistant Examiner.*